United States Patent [19]

McGeoch et al.

[11] 4,167,007
[45] Sep. 4, 1979

[54] METHOD AND APPARATUS FOR IDENTIFYING RADAR TARGETS

[76] Inventors: Ian L. M. McGeoch, Southerns, Castle Hedingham, Halstead, Essex; William B. Stawell, The Warren, Chalfont Rd., Beaconsfield, Buckinghamshire, both of England

[21] Appl. No.: 811,428

[22] Filed: Jun. 29, 1977

[30] Foreign Application Priority Data

Jun. 30, 1976 [GB] United Kingdom ............... 27172/76

[51] Int. Cl.$^2$ .............................................. G01S 9/56
[52] U.S. Cl. ............................................... 343/6.5 LC
[58] Field of Search ....................... 343/6.5 R, 6.5 LC

[56] References Cited

U.S. PATENT DOCUMENTS

| | | | |
|---|---|---|---|
| 2,427,523 | 9/1947 | Dolberg et al. ................. | 343/17.1 R |
| 2,943,318 | 6/1960 | DeLoraine et al. ........... | 343/6.8 R X |
| 3,368,219 | 2/1968 | Gardner .......................... | 343/6.5 LC |
| 3,512,154 | 5/1970 | Farrar ............................. | 343/6.8 LC |
| 3,718,926 | 2/1973 | Parker et al. .................. | 343/6.5 R X |
| 3,750,163 | 7/1973 | Hecker .......................... | 343/18 E X |
| 3,788,647 | 1/1974 | Evans .............................. | 343/6.5 R X |
| 3,875,570 | 4/1975 | Litchford ....................... | 343/6.5 LC |
| 3,913,100 | 10/1975 | Janex .............................. | 343/6.5 LC |
| 3,945,006 | 3/1976 | Cleeton .......................... | 343/6.5 R X |
| 3,949,397 | 4/1976 | Wagner et al. ................ | 343/18 E X |

*Primary Examiner*—Malcolm F. Hubler

[57] ABSTRACT

A method for identifying radar targets, especially ships at sea involves transmitting a first interrogation pulse, thereby causing a responder to generate a first identification signal containing a first set of data concerning the identity of the target, transmitting a second interrogation pulse causing the responder to generate a second identification signal containing a second set of data concerning the identity of the target and thereafter combining the two sets of data. The method reduces bandwidth requirements and garbling. An interrogator and responder for use in the method are also provided.

28 Claims, 3 Drawing Figures

METHOD AND APPARATUS FOR IDENTIFYING RADAR TARGETS

BACKGROUND OF THE INVENTION

1. Field of the Invention

This invention relates to a method and apparatus for identifying radar targets whether fixed or mobile. The method and apparatus are especially useful for identifying ships at sea.

2. Prior Art

At present, ships at sea can only be identified by visual observation of the ship's name and port of registry which are painted on the hull, or by observation of flags or lamp signals indicating the four-letter International Identification Code signal of the vessel. These means of identification are inadequate at night or in bad visibility. There is accordingly a need for an improved method of identifying ships at sea, and since many observations of ships are today effected by radar rather than visually, it is advantageous for such a method to employ a radar-triggered identification signal. The present invention provides such an identification method and apparatus for use therein.

Radar identification systems have been known for many years, having originated during the Second World War in the IFF (Identity Friend or Foe) system. In such systems, an interrogation apparatus sends out a pulse of radio waves (usually of about radar frequency), which is recognised by an identification apparatus (known as a responder or transponder) fitted to a vehicle or other object within range of the interrogation apparatus. Upon receipt of the pulse, the responder sends back a reply signal, generally in the form of a train of pulses, which is decoded and displayed at the station containing the interrogation apparatus. Such systems, which require the provision of a responder on the vehicle or other object, are known as secondary radars, as distinct from primary radars which work by passive reflection of radio waves by targets. Normally a secondary radar is associated with a primary radar so that the responses received from responders on radar targets can be correlated with the echoes received by the primary radar from the targets themselves. Secondary radar systems are at present in use on some navigation buoys (the so-called "RACONS") and in the Air Traffic Control Responder (ATCR) system. In the latter system, the pilot of an aircraft, upon request by Air Traffic Control, sets his responder to give a desired 16-bit upon receipt of the appropriate radar signal; this 16-bit response is transmitted over a period of about 15μ secs.

The ATCR system cannot, in practice, be adapted to marine use. An airline pilot is trained in the use of the system and is in continual contact with Air Traffic Control. The minimum separation between aircraft is 1 nautical mile (n.m.) and is usually considerably greater, so that the apparatus has only, at most, to distinguish between two targets 1 n.m. apart. Air Traffic Control normally knows what aircraft should be within its airspace and can ask the pilots thereof to set their responders as Air Traffic Control desires. In addition, differences in height aid the identification of aircraft.

In contrast, the crews of ships at sea are not trained in the use of secondary radar systems and are not in continual contact with shore radar stations. They may approach each other more closely than aircraft and a practical primary radar system should be capable of distinguishing between two targets 0.5 n.m. apart on the same bearing. A shore station usually does not know what ships likely to be in its vicinity at any one time, and due to reflections from waves the problem of radar clutter is more serious in systems intended for use with ships than in systems intended for aircraft.

Because ship's crews are not trained in the use of secondary radar systems, it is in practice essential that the responder of a maritime secondary radar system should be such that once set, it will function automatically for long periods without attention from the crew. Thus, each ship must carry a responder giving a unique signal. To provide the necessary number of different responses, the response must take the form of a pulse train containing a considerable number of different binary digits (bits); for ease of reference, the response should indicate the four-letter International Identification Code signal of the vessel (which requires 24 bits) or, preferably, since not all nations' fleets use International Identification Codes, the seven-figure Lloyds' number (which requires 28 bits). However, the time between the receipt at the interrogator of the responses from two targets 0.5 n.m. apart on the same bearing is only about 6μ secs. and to avoid garbling (the corruption of signals due to signals from two different targets arriving at the interrogator at the same time), it is essential that the two responses, as received at the interrogator, should not overlap. Accordingly, the duration of the signal produced by the responder should not exceed about 6μ secs. To transmit at the responder 24 or 28 bits within 6μ secs. and to receive and decode with an acceptable error rate at the interrogator, under reception conditions which may be far from favourable, would make such great demands upon the bandwidth, timing and transmission power of the responder as to make that responder too complex and expensive for the system to be practicable.

The present invention seeks to provide a method for identifying a radar target which permits the responder to transmit a large number of bits concerning its identity using an acceptable bandwidth and pulse length. The present invention also provides an interrogator and responder for use in this method.

SUMMARY OF THE INVENTION

Accordingly, the invention provides a method for identifying a radar target, the method comprising:

transmitting from a base station a first interrogation radar pulse;

receiving the first interrogation radar pulse at the target, applying said pulse to a responder, thereby causing the responder to generate a first identification signal having a frequency different from that of the first interrogation radar pulse and containing a first set of data partially identifying the target;

transmitting the first identification signal from the target;

receiving the first identification signal at the base station;

transmitting from the base station a second interrogation radar pulse differing from the first interrogation radar pulse;

receiving the second interrogation radar pulse at the target, applying said pulse to the responder, thereby causing the responder to generate a second indentification signal having a frequency different from that of the second interrogation radar pulse and containing additional data concerning the identity of the target;

transmitting the second identification signal from the target;

receiving the second identification signal at the base station; and processing the first and second identification signals received by the base station and thereby producing a signal containing both the first and second sets of data concerning the identity of the target.

The invention also provides an interrogation apparatus for use in the method of the invention, the interrogation apparatus comprising:

a pulse generator capable of generating either a first interrogation signal or a second interrogation signal differing from the first interrogation signal;

transmitting means capable of transmitting either of said signals;

receiving means capable of receiving a first or a second identification signal from a target, each of which contains data concerning the identity of the target; and processing means which, upon receipt of the first and second identification signals, will generate a third signal containing all the data concerning the target contained in both identification signals.

Very desirably, the interrogation apparatus of the invention comprises a range gate and/or a bearing gate, the gates being interposed between the receiving means and the processing means, the range gate being such that it will only allow to pass therethrough signals received by the receiving means during a predetermined interval after one of the interrogation signals has been transmitted by the transmitting means, and the bearing gate being such that it will only allow to pass therethrough signals received by the receiving means between two predetermined bearings.

Finally, the invention provides an identification apparatus (or "responder") for use in the method of the invention, the identification apparatus comprising:

receiving means capable of receiving a first or a second interrogation signal, the second signal being different from the first signal;

a signal discriminator connected to the receiving means and capable of discriminating between the first and second interrogation signals;

a signal generator connected to the pulse discriminator and capable of generating a first or a second identification signal, these two signals containing different data and differing in frequency from the corresponding interrogation signals, the signal generator being such that when the signal discriminator indicates the receipt of a first interrogation signal by the receiving means, the signal generator will generate the first identification signal, whilst when the signal discriminator indicates the receipt of a second interrogation signal by the receiving means, the signal generator will generate the second identification signal; and transmitting means capable of transmitting the first and second identification signals generated by the signal generator.

To reduce the error rate in the method of the invention, the initial parts of the interrogation and/or identification signals preferably comprise a plurality of check pulses, and the interrogation apparatus and/or the responder incorporates a gate means which will reject any incoming signal which does not begin with the appropriate check pulses. Desirably, check pulses are provided at both the beginning and the end of each interrogation and/or identification signal and the gate means rejects any incoming signal which does not both begin and end with the appropriate check pulses. In the latter cases, the two sets of check pulses are conventionally referred to as "framing pulses".

Although theoretically when using the method of the invention it might be possible to use a normal marine search radar to provide the radar signal which actuates the identification apparatus, for practical reasons it is almost essential that a separate radar apparatus be used to provide the actuating signal. For reasons discussed below, the actuating signal will very preferably take the form of a pulse train rather than a single pulse and producing such a pulse train at the output of a conventional radar is difficult, if not impossible, and would in any case demand extensive modification of the search radar apparatus. Furthermore since search radars use numerous different frequencies, the identification apparatus would have to respond to all possible search radar frequencies. Apart from the difficulties this would produce in the design of the identification apparatus, it would mean that the identification apparatus might be subjected to a large number of interfering signals entering the identification apparatus (including signals from other ships in the vicinity). This would seriously hamper the recognition and decoding of genuine interrogation signals.

For similar reasons, it is highly desirable that the aerial which receives the response from the identification apparatus be separate from the search radar aerial. If a combined search/interrogation radar were used, the response from the identification apparatus might appear on the search radar display screen as a "tail" to the normal radar blip. This "tail" would not be readable by the operator and would only serve to confuse the display.

Although the preferred form of interrogation radar is thus a unit separate from the search radar and operates on a different frequency with its own aerial, transmitter, receiver, drive means and decoder, it conveniently has its transmitter and receiver aerial fixedly mounted on the search radar aerial and rotates therewith.

To correlate the signals from the identification apparatus with the blip representing the target, the search radar is desirably provided with apparatus by means of which the operator can strobe the target he wishes to identify using the search radar's range strobe and bearing cursor and then request the interrogation radar to display the decoded response from the strobed target. This display could then be written onto the search radar display using, for example, a chinagraph pencil. (Whilst it would be possible to incorporate into the apparatus circuits which would cause the decoded response to be displayed alongside the blip representing the target and to follow the blip across the screen, in practice such sophistication is unnecessary having regard to the relatively slow movement of ships across a marine radar screen.)

Although the method of the invention uses at least two differing interrogation signals and at least two identification signals, there may of course be more than two of each type of signal. In practice, in order to keep the length of each identification signal down to 6$\mu$ secs and the transmission rate down to 1 bit 1$\mu$ sec in order that the bandwidth requirement of the method may not be too great (see below) it is convenient for each identification signal to contain only two bits concerning the identity of the target flanked by two bit pairs of framing pulses. If it is desired that a ship be capable of identifying itself by its four-letter International Identification Code, this will require 24 bits and thus twelve different interrogation signals and twelve identification signals. If, on the other hand, it is desired that a ship be capable of identifying itself by its seven-digit Lloyds' number (encoded in digital-binary form), this will require 28 bits and thus fourteen different interrogation signals and fourteen identification signals.

Since the total duration of the identification signal preferably does not exceed 6μ secs, the time taken to transmit each bit therein should not be much greater than 1μ sec, so that the receiving station must have a bandwidth of about 1 MHz. In practice, to reduce error rates about twice this bandwidth should be used, so that a conventional double side band receiver will require a bandwidth of substantially 4MHz. To allow for frequency draft, at least in the identification apparatus, the overall bandwidth required in practice would be about 6MHz. Obviously, it is impossible to use this bandwidth in the VHF or UHF bands, so that preferably the identification signal is modulated onto a carrier whose frequency lies within or slightly above the existing marine radar X-band around 10 GHz. This band has the advantage that reasonably small aerials can be used (so that identification apparatus could be fitted in maritime aircraft or helicopters, and a small interrogation apparatus could be fitted in pilot boats or other small craft), whilst keeping rain attenuation to an acceptably low level; fairly heavy rain at 10 mm/hr will only reduce the range of the method by about 30%.

It will be appreciated that, since in the method of the invention the frequencies of the signal applied to the target and of the identification signal differ, reflections of the applied signal from the sea or from raindrops will not affect the efficacy of the method.

BRIEF DESCRIPTION OF THE DRAWINGS

A preferred method and apparatus of the invention will now be described in more detail, though by way of illustration only, with reference to the accompanying drawings, in which.

DETAILED DESCRIPTION OF THE DRAWINGS.

Figure 1:
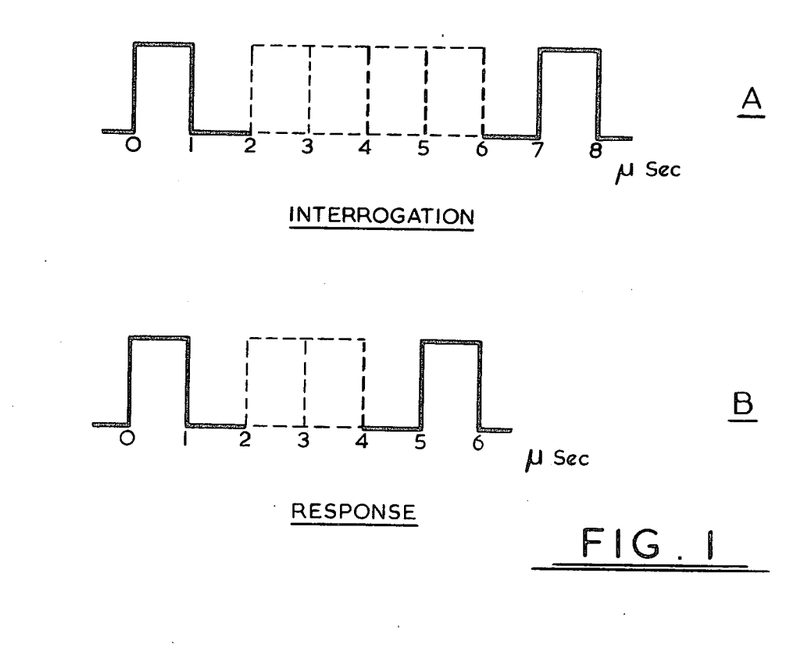
FIG. 1 shows the forms of the signal applied to a target (hereinafter referred to as "the interrogation signal") and of the identification signal.

The interrogation signal A shown in FIG. 1 comprises eight 1μ sec divisions each of which is either 0 or 1. The first two division are a 10 framing pair, whilst the last two are a 01 framing pair. The remaining four divisions can each be either 0 or 1, and thus sixteen different interrogation signals can be used if desired.

The response signal B shown in FIG. 1 comprises six 1μ sec divisions each of which is either 0 or 1. The first two and the last two divisions are respectively a 10 and a 01 framing pair, as in the interrogation signal A. The remaining two divisions can each be either 0 or 1 and thus the response signal B includes two bits of data concerning the identity of the unit by which it is transmitted.

A shore station for the tracking of ships is provided with a primary search radar operating in the X-band around 10 GHz which sweeps the whole sea area within 15 n.m. of the shore station and presents the results on a cathode ray tube display in the conventional manner. The shore station is also equipped with the interrogation apparatus shown diagrammatically in FIG. 2. This apparatus comprises a magnetron 1 having a frequency in the marine radar X-band at about 10 GHz, this frequency being different from that of the primary search radar. The output from the magnetron 1 is modulated by a modulator 2 which is under the control of a shift register 3. The modulated output from the magnetron 1, which has a pulse output power of 5kW, is passed to a circulator 4 and thence to an aerial 5. This aerial 5 is a waveguide fed cheese aerial.

Figure 2:
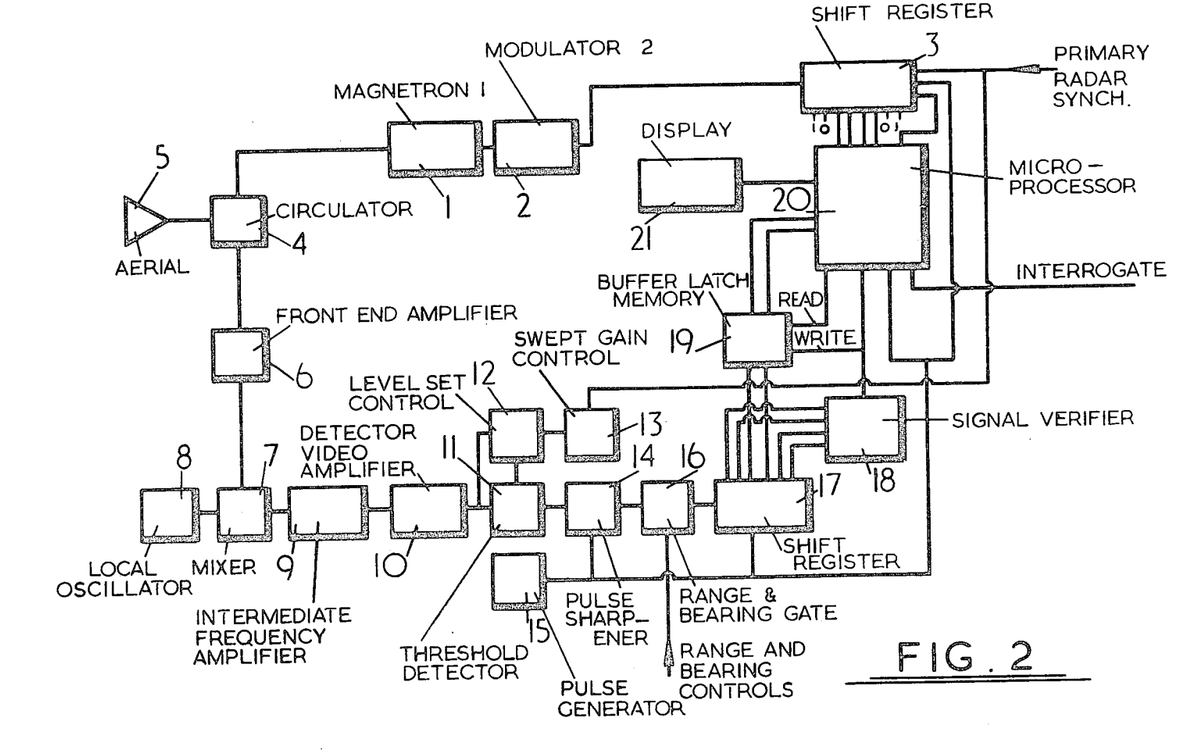
FIG. 2 is a block diagram of the apparatus used to transmit the interrogation signal whose form is shown in FIG. 1 and the receive the decode the identification signal shown in that Figure.
Figure 3:
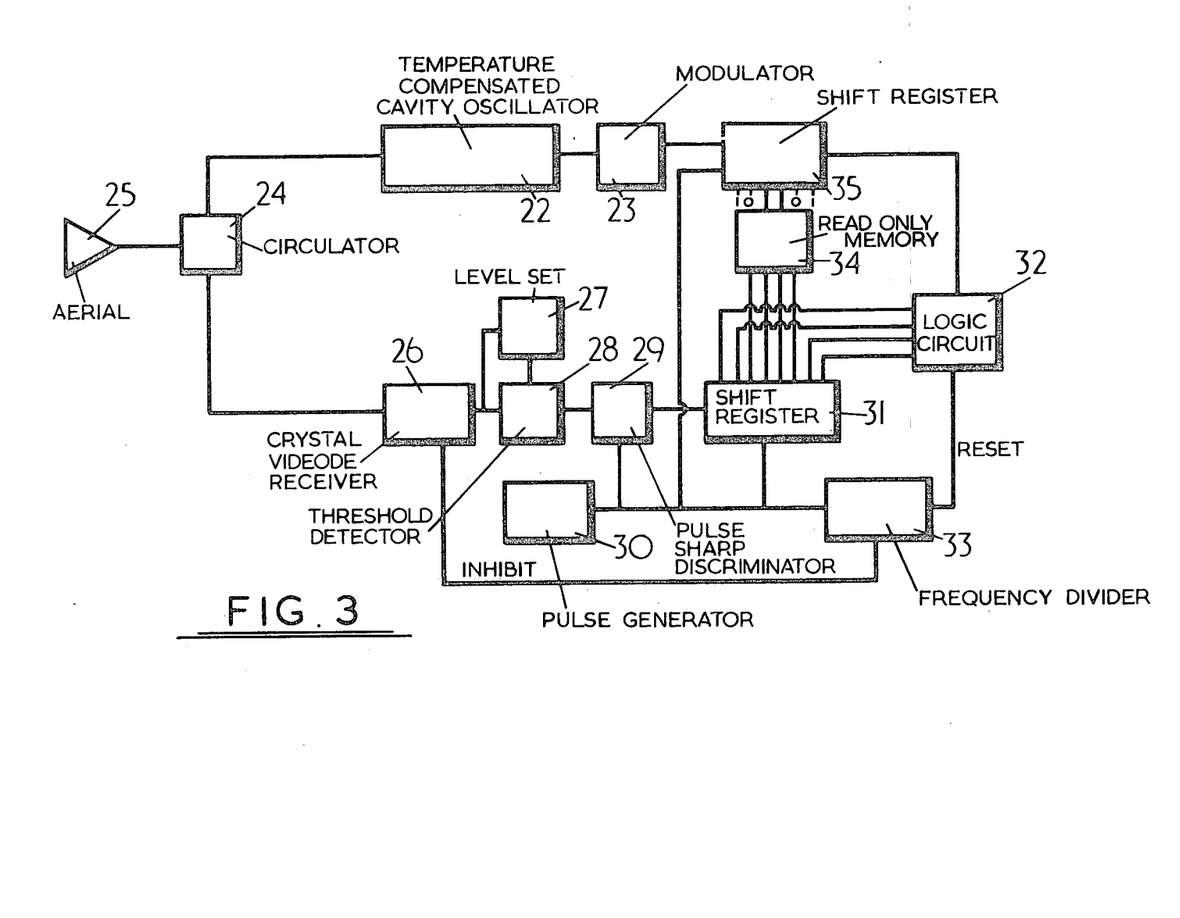
FIG. 3 is a block diagram of the identification apparatus which produces the identification signal shown in FIG. 1.

Any signals received by the aerial 5 are passed via the circulator 4 to a front end amplifier 6 and thence to a mixer 7, where they are mixed with the output of a local oscillator 8, whose frequency is substantially 60MHz different from that of the carrier of the identification signals produced by the responder which is shown diagrammatically in FIG. 3. The mixed signal from the mixer 7 is passed to an intermediate frequency amplifier 9 which amplifies only the 60MHz beat frequency produced in the mixer 7, eliminating the 10GHz carrier. (It is difficult to amplify 10GHz signals and thus in practice it is easier to produce a VHF signal and then amplify that.) The output from the intermediate frequency amplifier 9 is fed to a detector/video amplifier 10, which amplifies and demodulates the signal. The demodulated signal is passed to a threshold detector 11 which suppresses all signals weaker than that which would be produced by the reception at the aerial 5 of an identification signal from the responder shown in FIG. 3 mounted in a target at the maximum range of 15n.m. The threshold detector 11 is controlled by a level set control 12 which automatically sets the threshold level of the detector 11 relative to receiver noise and which is itself controlled by a swept gain control 13. The swept gain control 13 is fed with synchronizing signals from the primary radar and acts so that the threshold detector 11 will only allow signals to pass for targets less than 1 n.m. from the shore station if their strength is commensurate with a signal from a responder at that range. This enables the apparatus to reject responses which have been triggered by side lobe radiation from the aerial 5; in a typical aerial the first side lobe is about 25dB down on the main lobe, so that for apparatus having a maximum range of 15 n.m., side lobe triggering will not be significant beyond 1 n.m.

The output from the threshold detector 11 is fed to a pulse discriminator and sharpener 14 which is also fed with clock pulses from a 1 MHz square-wave generator 15. The sharpened pulses are then passed to a range and bearing gate 16, which is fed with synchronising signals from the primary radar apparatus and suppresses all signals other than those emanating from targets within specific ranges of range and bearing which are set manually by an operator. The gated signals are passed to a shift register 17 which receives clock pulses from the generator 15 and which feeds the outer two pulses from each end of the signal to a framing pulse verifier 18, whilst feeding the central four pulses, diagrammatically shown as two, to a buffer latch memory 19. The verifier 18 will, if the framing pulse of the received signal are the correct 10-01 sequence, send a signal to a microprocessor 20; if the framing pulses do not form this sequence, the verifier 18 sends no signal. Upon receipt of a signal from the verifier 18, the micro-processor 20 causes the bits stored in the memory 19 to be transferred to a memory within the micro-processor 20.

The responder shown in FIG. 3 comprises a temperature-compensated cavity oscillator 22 which is modulated by a modulator 23 which is under the control of a shift register 35. The output from the oscillator 22 is passed to a circulator 24 and transmitted to an omnidirectional aerial 25.

Signals received by the aerial 25 are passed by the circulator 24 to a crystal videode receiver 26, which demodulates and amplifies them. The resultant signals are fed to a threshold detector 28 controlled by a level set control 27, thence to a pulse discriminator and sharpener 29 fed with 1 MHz clock pulsues by an oscillator 30 and thence to a shift register 31. The integers 27, 28, 29, 30 in the responder act in the same manner as the integers 12, 11, 14, 15 and 17 respectively in the interrogation apparatus except that, for obvious reasons, no swept gain control or range and bearing gate are connected thereto.

The shift register 31 is fed with clock pulses by the generator 30 and supplies the outer two pairs of bits from the signal received to a respond logic circuit 32 which checks that these two pairs of bits have the required 10-01 sequence. Provided that the bits supplied to the logic circuit 32 do indeed have the correct sequence, that circuit 32 sends a reset signal to a frequency divider 33, which is supplied with clock pulses from the generator 30 and which divides the frequency of these clock pulses by six. Upon receipt of a reset signal from the logic circuit 32, the frequency divider 33 sends an inhibiting signal lasting 6μ secs to the videode 26, thereby preventing the videode from operating for this period. This prevents any further signals being received and processed by a responder before it has completed the sending of its response to the first signal received.

The central four bits of the output from the shift register 31 are passed to a read-only memory 34, wherein is stored the ship's identification signal. Upon receipt by a shift register 35 of a signal from the logic circuit 32 indicating that the correct framing pulses are present, the memory 34 sends two bits of the identification code stored therein to the shift register 35, these two bits being determined by the four bits of the received interrogation signal which are fed into the memory 34 by the shift register 31. The shift register 35 then acts on the oscillator 22 causing it to transmit to the circulator 24 an identification signal comprising successively a 10 framing bit pair, the two bits of the identification code supplied by the memory 34, and a final 01 framing bit pair. The resultant signal is transmitted from the circulator 24 via the aerial 25, the output power of the device being 500 mW.

The apparatus shown in FIGS. 2 and 3 is used as follows. An operator who wishes to identify a ship which appears on the search radar screen manually sets range and bearing controls so that only the ship to be identified lies within the box defined by the set range and bearings. The operator then presses an "interrogate" button which sends a signal to the micro-processor 20. Upon receipt of this signal, the micro-processor 20 places in the shift register 3 the four bits 0000. The shift register is fed with synchronising signals which indicate the bearing of the search radar aerial, which always faces in the same direction as the aerial 5, and the time of transmission of the search radar pulses. When these synchronising signals indicate that the search radar has a bearing within the arc set by the operator and that a primary radar pulse is about to be transmitted, the shift register 3 supplies to the power amplifier/modulator 2 a signal comprising the four bits supplied by the micro-processor 20 surrounded by the framing bit pairs 10-01; thus the signal received by the amplifier/modulator 2 is 10,000,001 which constitutes the first interrogation signal. The amplifier/modulator 2 modulates the carrier wave produced by the magnetron 1 in accordance with this signal and transmits it from the aerial 5 via the circulator 4 in synchronisation with the search radar pulse.

If no appropriate resonse to the outgoing signal is received by the verifier 18 within a period determined by the range and bearing gate 16, the interrogation apparatus will continue to send the first interrogation signal in synchronisation with the next search radar pulse.

When the aerial 25 of the responder receives the first interrogation signal, the circulator 24 passes it to the videode 26, and thereafter it is processed by the threshold detector 28 and the pulse sharpener 29, finally being passed to the shift register 31. The register 31 passes the framing bits of the signal to the logic circuit 32, which confirms that the framing pulses are correct (and thus that a proper interrogation signal has been received) and causes the frequency divider 33 to inhibit the videode 26 for the next 6μ secs. The four central bits (0000) of the first interrogation signal are passed to the memory 34 and, upon a command received from the logic circuit 32, the shift register 35 loads the first two bits of the ship's identification signal stored in memory 34. The register 35 forthwith causes the power amplifier/modulator 23 to modulate the output from the cavity oscillator 22 to produce a first identification signal comprising the first two bits of the ship's identification signal framed by the framing bit pairs 10-01, and this first identification signal is transmitted from the aerial 25 via the circulator 24.

Upon receipt of the first identification signal by the aerial 5 of the interrogation apparatus, that signal is amplified, mixed, re-amplified, demodulated and passed through the threshold detector 11, the pulse sharpener 14 and the gate 16 in the manner previously described. The signal is then passed to the shift register 17, which passes the framing bits of the signal to the verifier 18, which itself confirms that the framing pulses are correct (and thus that a proper identification signal has been received). The two central bits of the signal are supplied by the register 17 to the buffer memory 19 and, upon receipt by the micro-processor 20 of the signal from the verifier 18 indicating that a proper identification signal has been received, are stored therein. The micro-processor 20 now sends the bits 0001 to the shift register 3 which in turn causes the power amplifier/modulator 2 to transmit a second interrogation signal 10000101 in synchronisation with the search radar pulse.

The above cycle of events is repeated until, after the sending of fourteen different interrogation signals and the receipt of fourteen identification signals, the buffer memory 19 contains 28 bits representing the seven-figure Lloyds' number of the ship in digital-coded binary form. The micro-processor 20 then reads these 28 bits, converts them to digital form and causes the result to be displayed on a luminous display 21 in front of the operator. The operator can then, if desired, transfer this result to the search radar display by means of a chinagraph pencil or other erasable medium.

Should a proper identification signal not be received in response to the transmission of any given interrogation signal in synchronisation with the search radar pulses until an appropriate identification signal is received.

The use of a 500 mW responder at the maximum range of 15 n.m. using an interrogation apparatus having a beam width of 1.5° and an aerial gain of 32 dB implies that the receiver loss and noise factor of the interrogation apparatus must be kept down to about 10 dB to obtain the signal-to-noise ratio of 16 dB which previous work indicates is needed for reliable detection and an acceptable error rate. Such a receiver loss and noise factor can be achieved using currently-available front end parametric amplifiers.

All the components of the interrogation apparatus and responder shown in FIGS. 2 and 3 are well-known to those skilled in the art and it is therefore believed that the production of the detailed circuitry, and the programming of the micro-processor 20 and the logic circuit 32 will present no problems to those skilled in the art.

The apparatus shown in FIGS. 2 and 3 may be modified in various ways. Thus, either or both of the magnetron 1 and the cavity oscillator 22 may be replaced by a crystal oscillator operating at about 10 MHz together with a frequency multiplier followed by a power amplifier which multiplies the frequency of the crystal oscillator up to the necessary 10 GHz band.

Although the method of the invention is primarily intended for use in identifying ships, it may also be used for the control of aircraft and land vehicles (for example, during military manoeuvres).

We claim:

1. In a method for identifying a radar target by transmitting from a base station a first interrogation radar pulse, receiving the first interrogation radar pulse at the target and applying said pulse to a responder, thereby causing the responder to generate a first identification signal having a frequency different from that of the first interrogation radar pulse and containing a first portion of data concerning the identity of the target, transmitting the first identification signal from the target, and receiving the first identification signal at the base station, the improvement which comprises transmitting from the base station at least a second interrogation radar pulse differing from the first interrogation pulse, each interrogation pulse, when more than two are transmitted following the first radar pulse in a fixed predetermined sequence, receiving at least the second interrogation radar pulse at the target and applying said pulse to the responder, thereby causing the responder to generate a second identification signal having a frequency different from that of the second interrogation radar pulse and containing additional data concerning the specific identity of the target, aside from its class, transmitting the second identification signal from the target, receiving the second identification signal at the base station and processing the first and second identification signals received by the base station and thereby producing a signal containing all the data concerning the specific identity of the target.

2. The improvement according to claim 1, in which more than two interrogation pulses and identification signals are provided, the interrogation pulses being transmitted in a predetermined sequence following each receipt at the base station of an identification signal from the target, the initial part of at least one of said interrogation and identification signals comprising a plurality of check pulses, the interrogation apparatus and/or the responder incorporating a gate means for rejecting any incoming signal which does not begin with the appropriate check pulses.

3. The improvement according to claim 2, in which the check pulses are provided at both the beginning and the end of at least one of said interrogation and identification signals and the gate means rejects any incoming signal which does not both begin and end with the appropriate check pulses.

4. The improvement according to claim 1, in which the duration of each identification signal is not substantially greater than $6\mu$ secs.

5. The improvement according to claim 1, in which the base station is provided with manually-presettable range and bearing controls and with a range and bearing gate which will only allow to pass therethrough responses emanating from targets having ranges and bearings within limits specified by the setting of the range and bearing controls.

6. The improvement according to claim 1, in which the base station transmits each interrogation pulse at intervals until an identification signal is received and thereafter transmits the subsequent interrogation pulse.

7. An interrogation apparatus for use in the method of claim 1, said interrogation apparatus comprising:
   a pulse generator for generating a plurality of interrogation signals in a fixed predetermined sequence and which differ from one another;
   transmitting means for transmitting the plurality of interrogation signals in said fixed sequence;
   receiving means for receiving a plurality of identification signals from a target, each identification signal containing a portion of data concerning the identity of a specific target; and
   processing means which, upon receipt of the plurality of identification signals, generates a further signal containing all the data portions concerning the target contained in the plurality of identification signals.

8. An interrogation apparatus according to claim 7, which further comprises a gate means interposed between the receiving means and the processing means, said gate means only allowing to pass therethrough an incoming signal which begins with a predetermined series of check pulses.

9. An interrogation apparatus according to claim 8, in which said gate means will only allow to pass therethrough an incoming signal which both begins and ends with predetermined series of check pulses.

10. An interrogation apparatus according to claim 7, which further comprises a range and bearing gate, said gate being interposed between the receiving means and the processing means and only allowing to pass therethrough signals received by the receiving means between two predetermined bearings during a predetermined interval after one of the interrogation signals has been transmitted by the transmitting means.

11. An interrogation apparatus according to claim 7 in which the pulse generator generates, and the transmitting means transmits, each interrogation signal at intervals until an identification signal is received by the receiving means and thereafter transmits the subsequent interrogation signal.

12. An interrogation apparatus according to claim 7, in which the receiving means includes a swept gain amplifier whose gain is reduced for a predetermined interval after the transmission of an interrogation signal by the transmitting means.

13. An identification apparatus for use in the method of claim 1, said identification apparatus comprising:
   receiving means for receiving in a fixed predetermined sequence a plurality of interrogation signals differing from one another;
   a signal discriminator connected to the receiving means for discriminating between said plurality of interrogation signals;
   a signal generator connected to the pulse discriminator for generating a plurality of identification signals as a function of receipt of predetermined interrogation signals in said predetermined sequence, each identification signal containing different data and differing in frequency from the corresponding interrogation signals, the signal generator, upon the signal discriminator indicating the receipt of a first interrogation signal by the receiving means, generating a first identification signal, and when the signal discriminator indicates the receipt, after generation of the first identification signal by the signal generator, of a second interrogation signal by the receiving means, the signal generator generating a second identification signal; and
   transmitting means for transmitting at least the first and second identification signals generated by the signal generator.

14. An identification apparatus according to claim 13, in which the signal discriminator will only cause the signal generator to generate an identification signal when an incoming signal begins with a predetermined series of check pulses.

15. An identification apparatus according to claim 14, in which the signal discriminator will only cause the signal generator to generate an identification signal when an incoming signal both begins and ends with predetermined series of check pulses.

16. An identification apparatus according to claim 13, in which the duration of each identification signal is not greater than about 6$\mu$ secs.

17. An identification apparatus according to claim 13, in which a variable gain amplifier is interposed between the receiving means and the signal discriminator, and in which, upon receipt of an interrogation signal by the signal discriminator, the gain of the variable gain amplifier is inhibited for the period during which the transmitting means transmits the corresponding identification signal.

18. A method for identifying a radar target by transmitting from a base station a first modulated interrogation radar pulse of a fixed predetermined carrier frequency, receiving the first modulated interrogation radar pulse at the target, applying said pulse to a responder at the target for generating by the responder, as a function of the modulation component of the first modulated interrogation radar pulse, of a first identification signal containing target identifying data, transmitting the first identification signal from the target to the base station, receiving the first identification signal at the base station, transmitting from the base station, in fixed sequence to the transmission therefrom of said first modulated interrogation pulse, of a second modulated interrogation pulse of the same carrier frequency as the first modulated interrogation pulse, receiving said second modulated interrogation signal at the target, applying said second modulated interrogation pulse to the responder for generating thereby, as a function of the modulation component of the second modulated interrogation radar pulse, a second identification signal containing additional data concerning the identity of the target, transmitting the second identification signal from the target to the base station, receiving the second identification signal at the base station, processing the first and second identification signals received by the base station, and producing from said first and second identification signals a signal containing both the first and second sets of data concerning the identity of the target.

19. A method according to claim 18, in which said first and second identification signals are modulated carriers of the same carrier frequency, and in which the carrier component of at least one of said interrogation and identification signals is modulated by a plurality of check pulses, the interrogation apparatus and/or the responder incorporating a gate means for rejecting incoming carrier signals which are not modulated by the appropriate check pulses.

20. The method according to claim 19, in which the interrogation and identification signals have their carriers modulated by a train of pulses which include said check pulses, the check pulses in said train of pulses being at the beginning and at the end thereof, said gate means rejecting any incoming signal which does not both begin and end with the appropriate check pulses.

21. The method according to claim 18, in which the base station transmits each interrogation pulse in a fixed predetermined sequence on receipt of identification signals from the target, each said interrogation pulse comprising a fixed frequency carrier modulated by a train of pulses of different time sequence, the identifying signal transmitted from the target to the base station being a function of the time sequence of the train of pulses which modulate the interrogation pulse carrier.

22. An interrogation apparatus for generating first and second modulated interrogation signals differing from one another by the modulation component of a common carrier, transmitting means for transmitting the first and second interrogation signals; receiving means capable of receiving first and second modulated identification signals from a target, each of which identification signals comprise a common carrier modulated by signals containing data concerning the identity of the target, means for demodulating the received signals; and means for generating, upon receipt and demodulation of the first and second identification signals, a third signal containing cumulative data concerning the target.

23. An interrogation apparatus according to claim 22, in which the carrier of the identification signals is modulated by a train of pulses and in which a gate means is interposed between the receiving means and the processing means, said gate means only allowing to pass therethrough upon demodulating the modulated identification signals, a train of pulses which begins with a predetermined series of check pulses.

24. An interrogation apparatus according to claim 23, in which said gate means passes therethrough only an incoming signal the modulated component of which both begins and ends with predetermined series of check pulses.

25. An interrogation apparatus according to claim 22, in which the pulse generator generates, and the transmitter means transmits, each interrogation signal at predetermined intervals and in a predetermined sequence after receipt of each identification signal.

26. An identification apparatus for use in the method of claim 1, said identification apparatus comprising receiving means for receiving first and second modulated interrogation signals having a common carrier frequency, demodulation means for demodulating the modulated interrogation signals, a signal discriminator connected to the demodulator means for discriminating between the demodulated first and second interrogation signals; a signal generator connected to the signal discriminator for generating first and second identification signals, these two signals containing different identification data contained in the modulating component of the interrogation signals, the signal generator upon the signal discriminator receiving the demodulated first interrogation signal generating the first identification signal, and when the signal discriminator indicates the receipt, after generation of the first identification signal by the signal generator, of a second interrogation signal by the receiving means, the signal generator generating the second identification signal; and transmitting means for transmitting the first and second identification signals as modulating components of a carrier of common frequency.

27. Apparatus according to claim 26, in which the signal generator generates an identification signal only when an incoming interrogation signal has its carrier modulated by a predetermined series of check pulses.

28. In a method for identifying radar targets by transmitting from a common base station interrogation radar pulses to multiple targets, of random range and bearing, whereat the interrogation pulses are received and applied to responders at the targets for generating identification signals for transmitting the identification signals back to the base station, which comprises generating identification signals by each responder at each target which are different from the identification signals generated by other responders at other targets, transmitting bits of the identification signal to the base station in a predetermined sequence dependent on the predetermined sequence of transmission of interrogation pulses from the base station to the target, selecting identification signals from a selected target having a predetermined range and bearing relative to the base station, and processing the bits of the selected identification signals received at the base station to produce a signal containing all the data concerning the identity of the specific target selected.

* * * * *